United States Patent [19]

Lipschitz et al.

[11] Patent Number: 4,974,903
[45] Date of Patent: Dec. 4, 1990

[54] HEADREST FOR CONVEYANCE

[76] Inventors: Michal Lipschitz; Shay B. Lipschitz, both of 16 Nissenbaum Str., Jerusalem, Israel

[21] Appl. No.: 213,281
[22] Filed: Jun. 29, 1988

[30] Foreign Application Priority Data

Jul. 2, 1987 [IL] Israel .................................... 83070

[51] Int. Cl.⁵ .............................................. A47C 7/62
[52] U.S. Cl. ...................................... 297/188; 297/391
[58] Field of Search .................... 297/188, 191, 391; 224/148; 220/85 H

[56] References Cited

U.S. PATENT DOCUMENTS

| | | | |
|---|---|---|---|
| 2,349,766 | 5/1944 | Simjian | 297/191 X |
| 2,404,109 | 7/1946 | Steele | 297/188 |
| 2,684,787 | 7/1954 | Charpiat | 224/148 R |
| 3,449,011 | 6/1969 | Edwards et al. | |
| 3,568,890 | 3/1971 | Leachman | |
| 4,274,566 | 6/1981 | Rone | 224/148 X |
| 4,559,939 | 12/1985 | Levine et al. | |
| 4,609,166 | 9/1986 | Brennan | |
| 4,629,098 | 12/1986 | Eger | 224/148 X |
| 4,782,945 | 11/1988 | Geiler et al. | 220/85 H |

FOREIGN PATENT DOCUMENTS

2080947 11/1971 France .
480025 12/1969 Switzerland ..................... 297/188

*Primary Examiner*—Jose V. Chen
*Attorney, Agent, or Firm*—Fleit, Jacobson, Cohn, Price, Holman & Stern

[57] ABSTRACT

A headrest for a seat of a conveyance comprises a headrest body mountable on the backrest of the seat and shaped to accommodate at least one container for a beverage, access to the container being provided for the removal from, and reinsertion into, the headrest of the container, at least a portion of the headrest constituting a receptacle for the container, and a dispensing apparatus dispensing the beverage from the container including a length of flexible tubing one end of which is attachable to a tube connector communicating with the interior of the container and a mouthpiece having a valve attachable to the other end for controlling beverage flow from the container.

18 Claims, 7 Drawing Sheets

HEADREST FOR CONVEYANCE

BACKGROUND OF THE INVENTION

The present invention relates to a headrest for a conveyance, especially for a road vehicle, adapted to accommodate one or more containers for beverages.

Long distance driving during the summer season, or in hot climates during most of the year, poses the urgent problem of liquid intake to prevent dehydration, a problem particularly acute with small children. As satisfaction of these needs cannot be made conditional on the availability of roadside facilities such as restaurants, snack-bars, kiosks and the like, the conventional solution is the taking along, in the car, in assorted bottles, cans, canteens, etc., of drinks, to be imbibed with, or more often without benefit of, glasses, cups, drinking straws, etc., a procedure to the messiness of which every experienced driver can attest.

BRIEF SUMMARY OF THE INVENTION

It is one of the objects of the present invention to overcome the above-described difficulties and to provide convenient and safe on-board, mid-travel drinking facilities for driver as well as passengers, whether adults or children.

This the invention achieves by providing a headrest for a seat of a conveyance, comprising a headrest body mountable on the backrest of the seat and shaped to accommodate at least one container for a beverage, means for access to the container for the removal from, and reintroduction into, the headrest of said container, at least a portion of the headrest constituting a receptacle for the container, and means for dispensing the beverage from said container, wherein the dispensing means comprises a length of flexible tubing one end of which is attachable to a tube connector communicating with the interior of the container, to the other end of which is attachable a mouthpiece means comprising valve means for controlling beverage flow from the container.

The invention further provides a headrest for a seat of a conveyance, comprising a headrest base mountable on the backrest of the seat, a container for a beverage accommodated in a housing selectively attachable to, and removable from, said headrest base, and means for dispensing the beverage from the container, wherein the dispensing means comprises a length of flexible tubing one end of which is attachable to a tube connector communicating with the interior of the container, to the other end of which is attachable a mouthpiece means comprising valve means for controlling beverage flow from the container.

With specific reference now to the figures in the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

The invention will now be described in connection with certain preferred embodiments with reference to the following illustrative figures so that it may be more fully understood wherein.

DETAILED DESCRIPTION

Referring now to the drawings, there is seen in FIGS. 1 to 4 a headrest body comprised of two lateral uprights 2,2' and a central portion 4. The headrest body is mounted on the upper edge of a car seat backrest 6 with the aid of two rods 8,8' fixedly held in the backrest 6 and projecting upwards. Two bores 10,10' inside the uprights 2,2' accommodate the rods 8,8', along which the headrest can be slid for height adjustment. The rods are advantageously provided with indexing notches 12 cooperating with a spring-loaded indexing ball 14. A handle 16,16' on top of the headrest facilitates adjustment.

Figure 2:
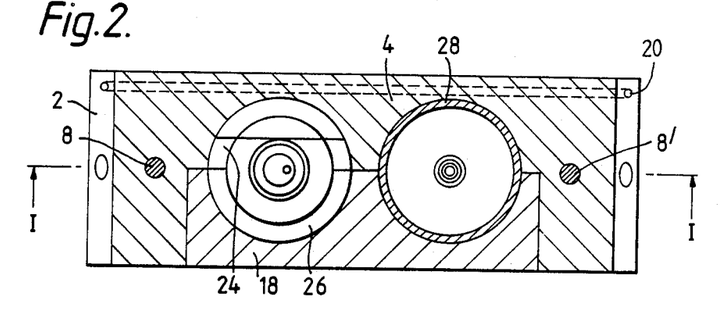
FIG. 2 is a top view, in cross section along plane II—II of FIG. 1.
Figure 3:
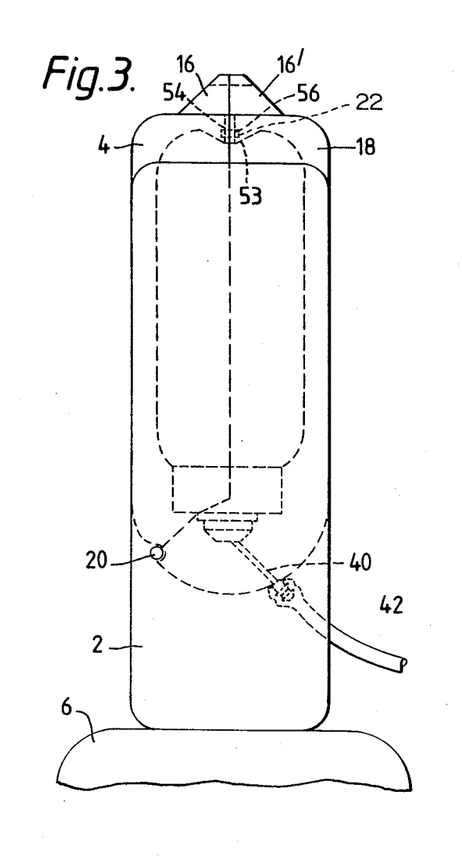
FIG. 3 is a side elevational view of the embodiment of FIG. 1 as mounted on the backrest of a car seat.
Figure 4:
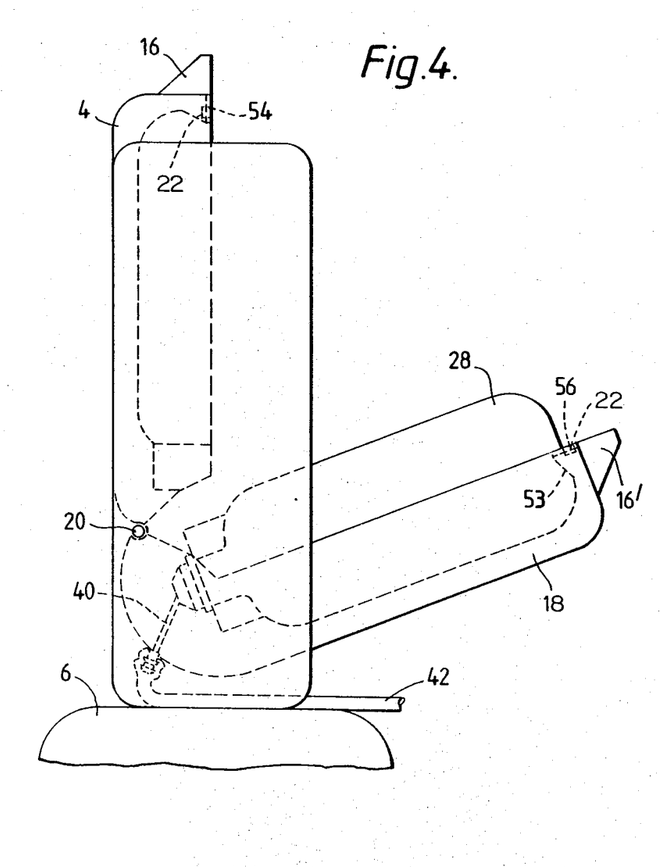
FIG. 4 is a view similar to FIG. 3 with the back of the headrest swung open, showing one of the bottles in position.

Further seen is an access door 18 articulated to the headrest body by means of a hinge 20, shown in FIG. 3 in the closed and, in FIG. 4 in the swung-open state. A magnetic latch on button 22 retains the door 18 in the closed state, in which, as can be seen in FIGS. 2 and 3, it complements the generally prismatic shape of the headrest.

Figure 1:
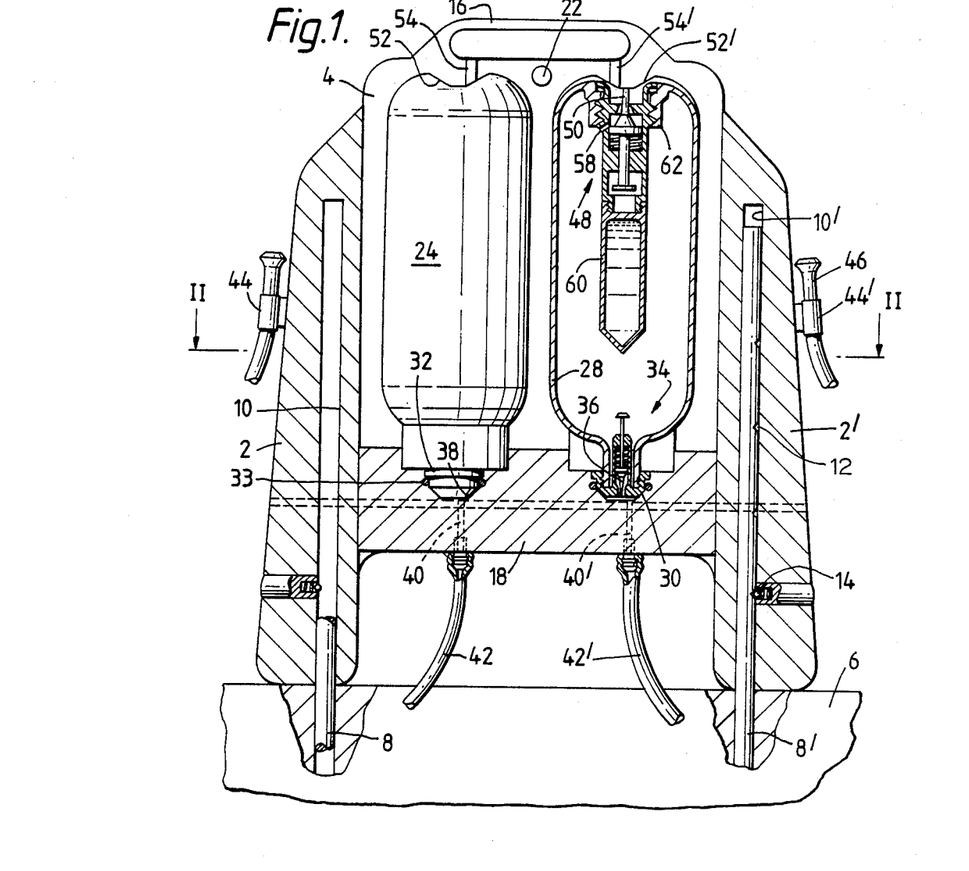
FIG. 1 is an elevational view, in cross section along plane I—I in FIG. 2, of a first embodiment of the headrest according to the invention.

The central body portion 4 is provided with two trough-like recesses 24 which, in the closed state of the door 18, register with similar recesses 26 in the door 18 and are each designed to accommodate a bottle 28, of which one, on the right, is shown in FIGS. 1 and 2. The bottles 28 have screw-on caps 30 which fit appropriately shaped recesses 32 in the lower portion of the access door 18 and are each provided with a needle valve 34 comprising a spring-loaded needle 36 that, as long as the bottle 28 is outside its receptacle in the headrest, closes the valve and prevents liquid from flowing out even when the bottle 28 is held upside down. When the bottles are introduced into the recesses 26 of the door 18 and their caps 30 slide into the recesses 32, the needle 36 of each cap is pushed up when its tip encounters the bottom 38 of the recess 32, thus opening the valve.

From the bottom position of the recess 32 (which is also provided with sealing rings 33) the liquid flows via a duct 40,40′ into rubber or plastic tubing 42,42′ which lead to a dispensing valve 44,44′ of a per se known type provided with mouth pieces 46 that, when pulled out, will let the liquid pass. When not used, the dispensing valves 44,44′ are magnetically or otherwise attachable to the uprights 2. In this way, the occupant of the seat can easily reach behind, get hold of the valve and have a drink even whilst driving.

Further seen inside the bottle 28 is a "breather" arrangement that permits air to enter the bottle to the degree liquid is drawn out. This has the form of another needle valve, 48, that, with the bottle 28 outside of the headrest, allows it to be filled through its neck and to be held "rightside up" without leaking. However, as soon as the bottle is inserted into its receptacle, the needle 50 is depressed by the slightly protruding portion 53 at the center of the top of the recess 26 as seen in FIG. 1, thereby establishing communication between the atmosphere and the inside of the bottle via the breather apertures 54,54′ in the central body portion 4 (as well as the complementary apertures 56,56′ in the door 18), and the port 58 of the valve body.

Further provided is a cooling attachment 60 in the form of a closed vessel filled with one of the known freezable liquid compounds and connectable to the valve body by a threaded connection for example. To remove the cooler for freezing and to return it to the bottle, it is of course necessary to remove the entire valve 48, to which end the head thereof is provided with a male thread which matches a female thread in a socket 62 provided in the bottom of the bottle 28. The valve 48 is screwed tight and untightened with the aid of e.g., a coin inserted in a slot (not shown) in the head.

While the headrest according to this embodiment has been described as slideable along rods 8 fixedly mounted inside the seat backrest, it is obviously also possible to fix the rods inside the headrest and have them slide—as well as index—in bushings mounted in the backrest.

Figure 5:
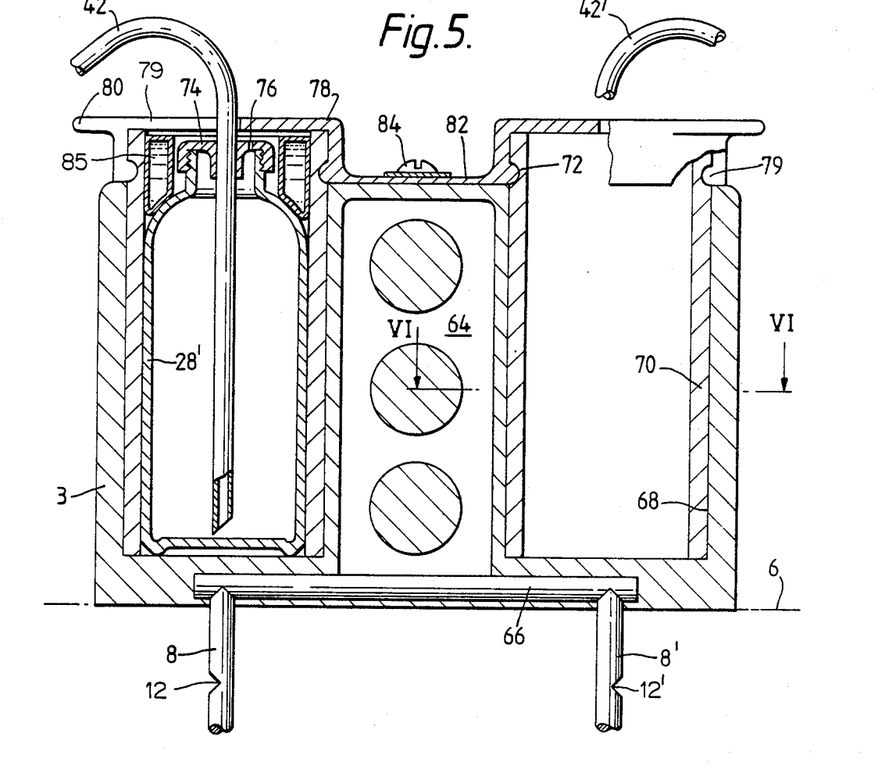
FIG. 5 is a cross-sectional view taken along plane V—V in FIG. 6 showing another embodiment of the invention.
Figure 6:
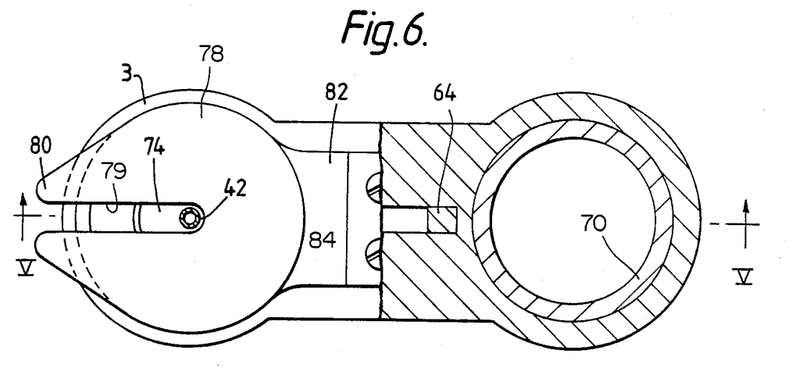
FIG. 6 is part top view, part cross section along plane VI—VI of FIG. 5.

A further embodiment of the invention is illustrated in FIGS. 5 and 6.

There is seen a plastic headrest body 3 in which is embedded, during the molding stage thereof, a supporting and reinforcing structure comprised of a vertical flat 64 welded to a horizontal bar 66 carrying at its ends the notched headrest-supporting rods 8,8′ which, in this embodiment, slide and index in bushings (not shown) mounted in the backrest 6.

In the headrest body 3 there are seen two large cylindrical recesses 68 provided with tubular liners 70 made of a relatively hard plastic, which to some extent protrude beyond the top surface of the headrest. Flush with this top surface, there is provided in the outside wall of these liners a peripheral groove 72, the purpose of which will become apparent further below.

The liners 70 are designed to accommodate the bottles 28′ one of which is shown on the left of FIG. 5. The bottles have a screw-on cap 74 with a central bore for the tubing 42 that reaches (in this embodiment) down to the bottom, and a small, off-center breather hole 76 to admit air.

The protruding end of the liners 70 is coverable by lids 78 made of a relatively flexible plastic such as one of the synthetic rubbers or the like. These lids 78 are provided with internally projecting beads 79 which, when the lids are applied, snap into the above-mentioned peripheral grooves 72 of the liners 70. The lids 78 are slotted at 79 (see FIG. 6) to permit withdrawal and insertion of the bottles 28 with the tubing 42 in position. Pulling tabs 80 facilitate opening of the lids 78. To prevent loss of the lids 78, these are advantageously interconnected by a thin, flexible strip 82, the central portion of which is fixedly connected to the headrest body 3 e.g., by means of screws 84.

Inside the liner 70, around the neck of the bottle 28, there is also some space for an annular cooler 85. In this embodiment, too, the tubing 42,42′ is provided with the above-described dispensing valves and attaching facilities.

Figure 7:
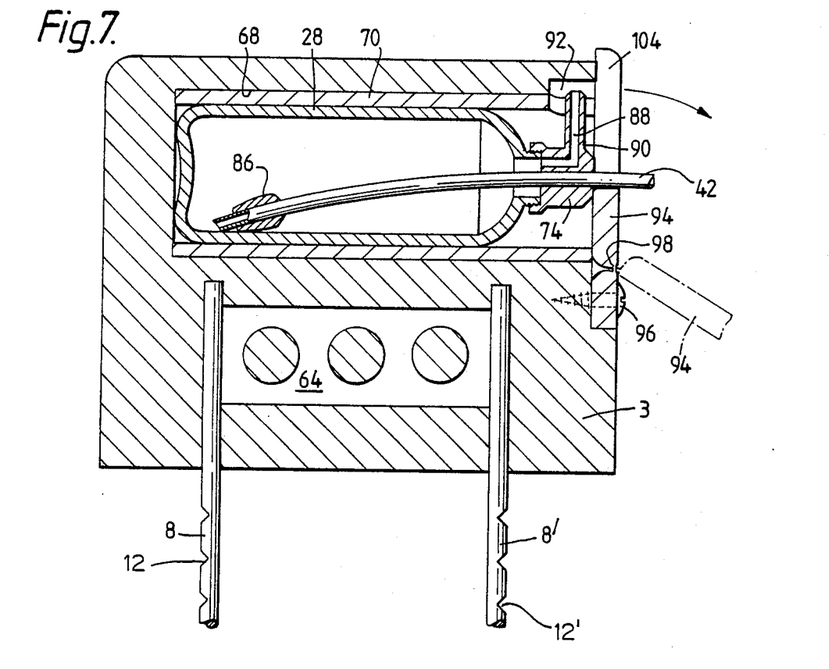
FIG. 7 is a view similar to FIG. 1 showing yet another embodiment of the invention.
Figure 8:
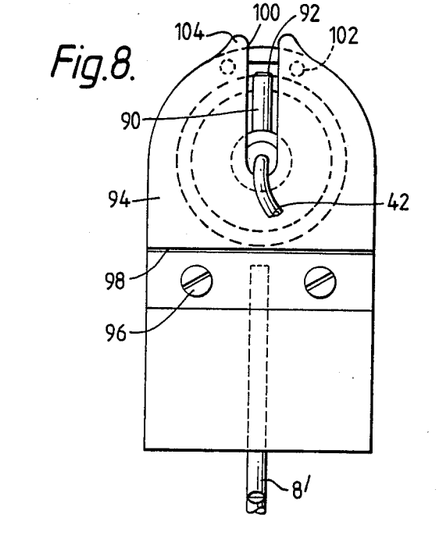
FIG. 8 is a right side elevational view of the embodiment of FIG. 7.
Figure 9:
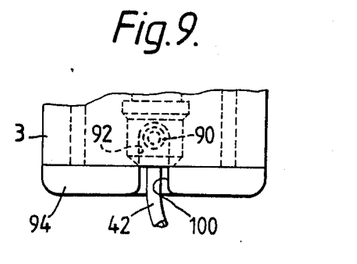
FIG. 9 is a partial top view of FIG. 8.

Another embodiment of the invention is shown in FIGS. 7–9.

There is seen a plastic headrest body 3 in which is embedded, during the molding stage thereof, a supporting and reinforcing structure comprised of a horizontally oriented flat 64 of a shape similar to that of the analogue structure in the previous embodiment, but here welded at both ends to the vertical, notched, headrest-supporting rods 8,8′.

In the headrest body 3 there is seen a cylindrical recess 68 provided with a tubular liner 70 made of a relatively hard plastic, extending from the recess bottom to the lateral face of the headrest body 3. The liner 70 accommodates the bottle 28 and its threaded cap 74 through which passes the plastic dispensing tubing 42, reaching far into the bottle 28 and being weighted down at its end by a relatively heavy body 86 made of an inert material e.g., porcelain. The cap 74 is also provided with a breather duct 88, the stem 90 of which is long enough to prevent outflow even when the full bottle 28 is in the horizontal position as shown. The slot 92 provided to accommodate the long stem 90 (see also FIGS. 8 and 9) is also narrow enough to permit its introduction only in a substantially vertical position and to maintain it in that position once so introduced.

The filled bottle 28 having been slid into the headrest body 3 as shown in FIG. 7, is secured in this position by a flap 94 attached at its lower end by screws 96 to the headrest body 3. The flap 94 is provided with a hinge 98 which is advantageously of the so-called integral or plastic type, that allows the flap 94 to be swung open in the downwards direction as indicated by the arrows. A radial slot 100 in the flap 94 permits the tubing 42 to be removed together with the bottle 28.

The flap 100 is retained in its closed position by two magnetic buttons 102 mounted flush with the face of the headrest body, with the appropriate iron armature mounted flush with the contact surface of the flap 94. Slightly protruding tables 104 facilitate opening of the flap 94.

Figure 10:
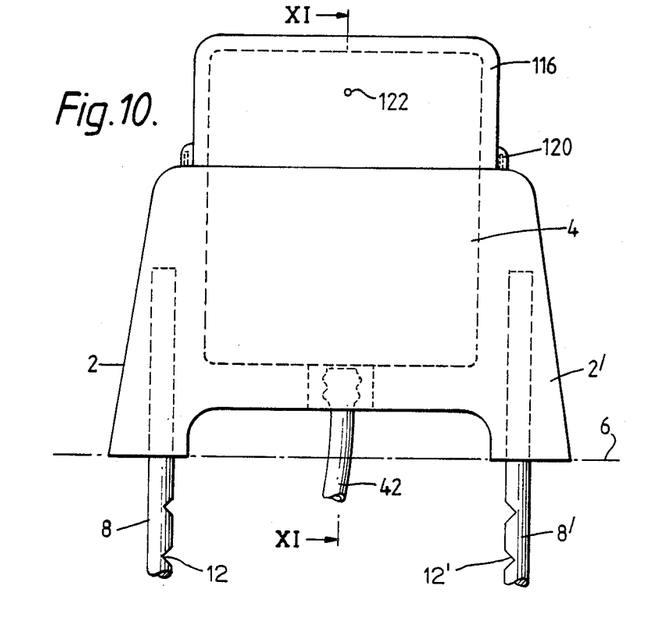
FIG. 10 is an elevational view of still another embodiment of the invention.
Figure 11:
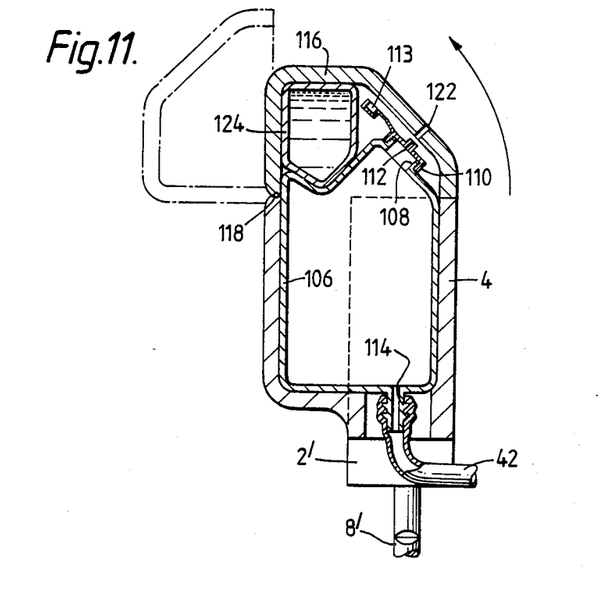
FIG. 11 is a cross-sectional view taken along plane XI—XI in FIG. 10.

Still another embodiment is shown in FIGS. 10 and 11.

There is seen a headrest body comprised of two uprights 2,2' and a central portion 4. The latter is in the form of a receptacle (see FIG. 10) accommodating a substantially prismatic container 106 having an inlet opening with a threaded neck 108 closable by a cap 110. The cap is provided with a breather hole 112 closable by a small cap 113 when the container is not inside the receptacle. The outlet at the bottom of the container 106 has the form of a conventional tube connector 114 to which is connected the dispensing tubing 42 carrying the already mentioned dispensing valve 44.

The receptacle-like central body portion 4 is provided with a lid 116 articulated to it by a hinge 118 and shown in the open position by the dash-dotted lines. The lid is maintained in the closed position by magnetic retainers 120 (FIG. 10). Also provided in the lid 116 is a breather hole 122.

Inside the closed lid there is also room for a cooler 124.

Yet another embodiment of the invention is illustrated in FIGS. 12 to 15.

Figure 12:
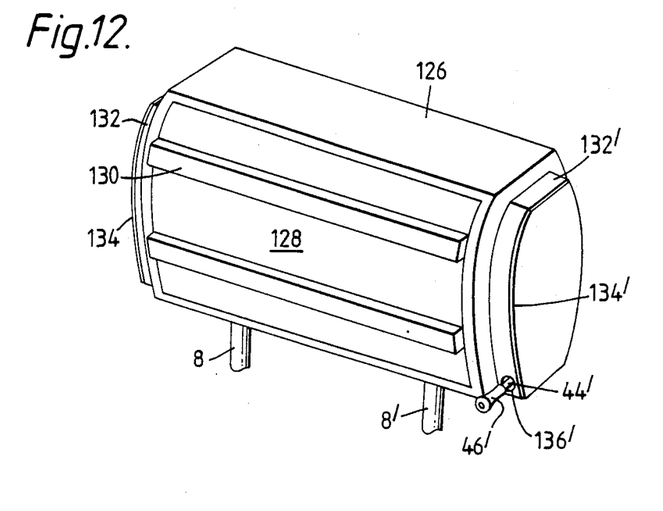
FIG. 12 is a perspective view, as seen from the rear, of a further embodiment of the invention.

There is seen in FIG. 12 a headrest body 126 which, by means of the notched rods 8,8', known from previous embodiments, is mountable on the upper edge of a car seat. Clearly seen in this view is also the access door 128 hingedly articulated to the lower edge of the headrest body 126 and shown in the closed position. The door panel is reinforced by means of two ribs 130.

Each of the lateral faces of the body 126 is provided with a raised portion 132,132' partially hollowed out for a purpose to become apparent further below, and covered with a removable cover 134,134'. At the lower end of the raised portion 132' there is seen an opening 136' through which slightly protrudes the mouthpiece 46' of the dispensing valve 44'. A similar opening, 163, is provided for the dispensing valve 44 and mouthpiece 46 on the opposite side (not visible in this view) of the other raised portion, 132. In a manner to be explained further below, the dispensing valves 44,44' and mouthpieces 46,46', connected to the liquid containers 138 (FIG. 15) inside the headrest body 126 via pieces of coiled tubing 140,140' (FIG. 13), can be conveniently pulled out for drinking. Thus the valve 44' and mouthpiece 46', facing the passenger compartment, are designed for use by the passengers, while the valve 44 and mouthpiece 46 (FIG. 13), located near the driver's head, is meant to serve the driver.

Figure 13:
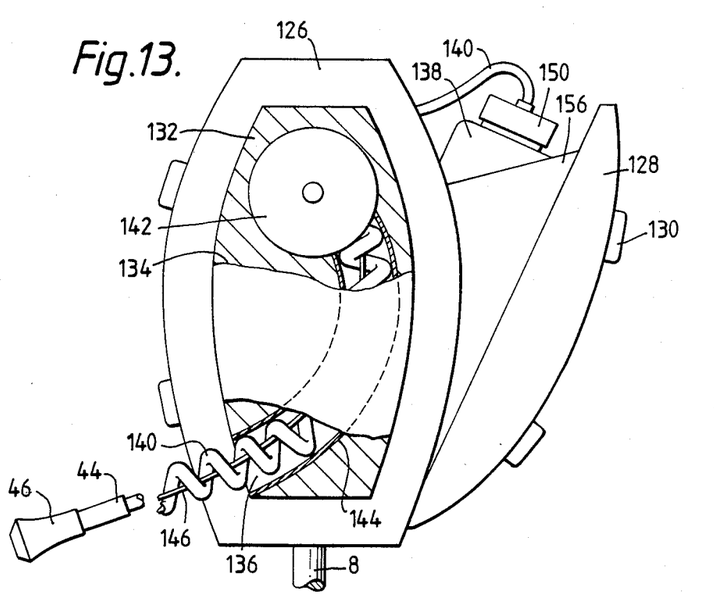
FIG. 13 is an end view of the embodiment of FIG. 12, with the access door open.

FIG. 13 is a side view, with the access door 128 partly open and the cover 134 partly cut to reveal the mechanism whereby the mouthpiece 46 and valve 44 are withdrawn after having been pulled out for use, in this view, by the driver.

This mechanism is per se known and used, e.g., in the so-called "droplights", where it serves to counterbalance the weight of a suspended lighting fixture, permitting it to be pulled down closer to a table or pushed up farther away from it. In its present application it is seen to consist of a flat, cylindrical box 142, countersunk in the raised portion 132, from which box emerges a length of coiled tubing 140. The upper end of tubing 140 is straight, i.e., non-coiled, passes via the box 142 into the hollow space inside the headrest and thence into the container 138.

Inside the raised portion 132, the coiled tubing 140 is accommodated in, and guided by, a bent tube 144 which leads from a point close to the box 142 to the lower opening 136. In the box 142 there is located a spiral spring (not shown), the outer end of which is attached to the inside of the box 142, and the inner end of which is fixed to a rotatably mounted drum (not shown) on which is wound a nylon cable 146, the lower end of which is attached to the valve member 44. The arrangement is such that when the latter is pulled out (upon which the pitch of the originally tightly coiled tubing 140 gradually increases), the cable 146 unwinds from the above-mentioned drum, thereby tensioning the spiral spring. When the user, having had his swig, lets go of the earlier described mouthpiece 46 and valve 44, the spiral spring, re-expanding, turns the drum which winds up cable 146, thereby pulling back the tubing 140 into the bent tube 144.

The same arrangement is also provided inside the other raised portion, 132', except that the opening 136', as already explained, points towards the passenger compartment.

Figures 14, 15, 16, 17, 18:
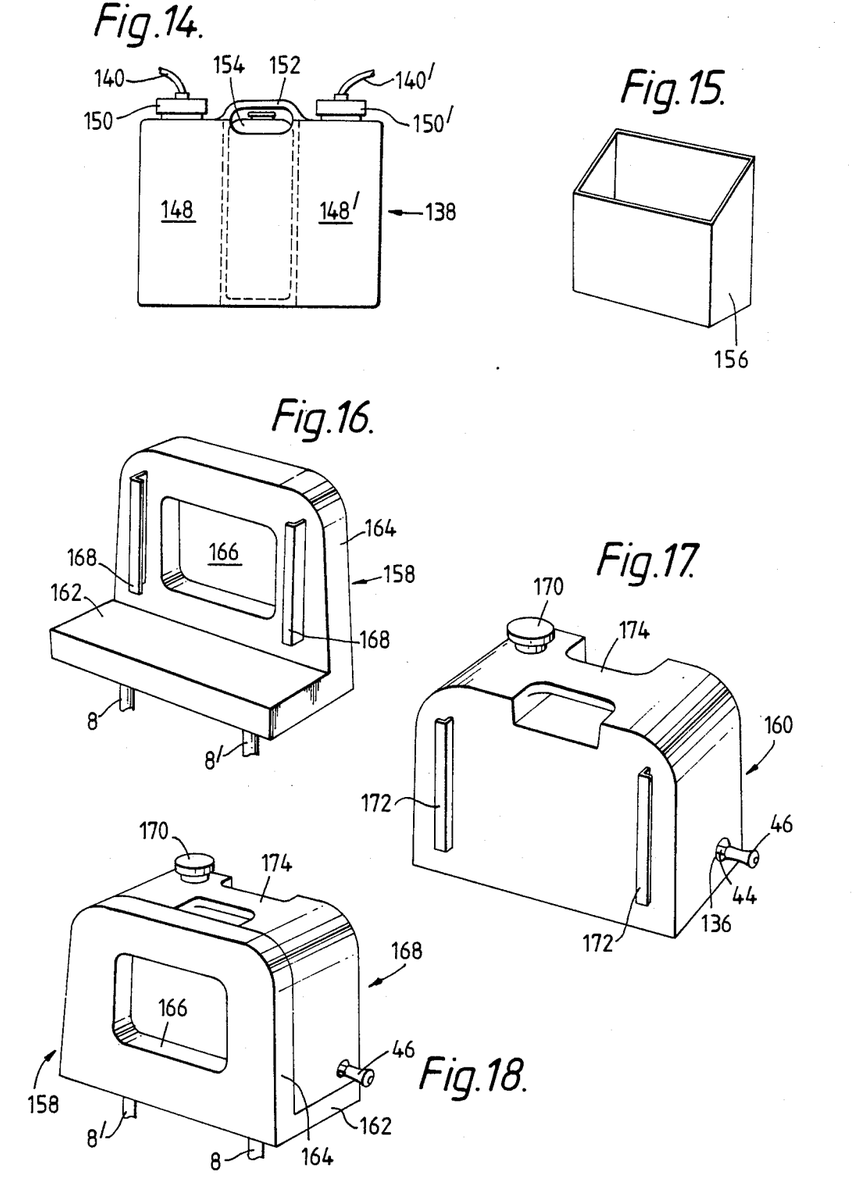
FIG. 14 is an elevational view of the beverage container of the embodiment of FIG. 12.
FIG. 15 is a perspective view of a removable holder for the beverage container.
FIG. 16 is a perspective view, as seen from the rear, of the headrest base of yet another embodiment of the invention.
FIG. 17 is a perspective view of the container housing of the embodiment of FIG. 16.
FIG. 18 is a perspective view of the fully assembled headrest comprising the headrest base of FIG. 16 and the container housing of FIG. 17.

The beverage container 138 is illustrated in FIG. 14. It is of a substantially prismatic shape and has two compartments into which, via stoppers 150,150', lead the respective ends of tubings 140,140'. A grip 152 facilitates handling of the container. Also provided is a cooler 154 which can be slid into the container 138 from below. The two compartments 148,148' may be separate, or may communicate with one another. In the former case, it is obviously possible to store two different beverages, e.g., coffee for adults and milk or cocoa for children.

The container 138 is not directly inserted into the hollow headrest, but is seated in a box-like holder 156 shown in FIG. 15. This holder, intended to prevent spillage from flowing into the headrest body, is removable for cleaning should such spillage occur.

Instead of the container 138, the holder 156 can also accommodate standard beverage cartons providable with connectors for the ends of tubings 140,140', or standard cans which, once opened, are providable with liquid-tight caPs having connectors for the above tubing ends. It is also possible to use the holder with collapsible containers.

Still another embodiment of the invention is shown in FIGS. 16 to 18. Here, the headrest consists of two separate and separable parts: the headrest base 158 (FIG. 16) which is permanently mounted on the seat, and the container housing 160 which is attachable to the base 158 and, when so attached, matches the outlines of the base 158 and complements the shape of the headrest.

The headrest base 158 is illustrated in FIG. 16 and is seen to be L-shaped. To the horizontal, shorter limb 162 of the L are connected the usual mounting rods 8,8', while the vertical, longer limb 164 has a window-like opening 166 against which rests the driver's head. On the inside surface of the vertical limb 164 there are provided L shaped guide and retaining rails 168, the purpose of which will become apparent further below.

The container housing 160, illustrated in FIG. 17, advantageously made of a thermally insulating, foamed plastic material is preferably molded around a liquid-tight container, access to which, for filling, rinsing, etc. is possible through an upper opening closeable by means of a stopper 170. Dispensing the beverage is effected in a manner similar to that explained in conjunction with the previous embodiment: a coiled length of tubing, accommodated in the container housing 160, with only the valve 44 and mouthpiece 46 showing. The tube coil is expansible to a sufficient degree for the mouthpiece 46 to serve the driver or passengers, and is automatically hauled back in when the mouthpiece is released.

Further seen are two guide and retaining rails 172, which due to shape and location interlock with guide rails 168 of the headrest base 158, forming together with them a vertical-drawer-like arrangement which retains the container housing 160. For separating the container housing from the headrest base 158, the housing 160 is pulled up vertically, until the rail pairs 168 and 172 disengage. A grip 174 facilitates handling and carrying.

Removable attachment of the container housing 160 to the headrest base 158 can obviously be realized in a variety of ways, apart from the guide rail arrangement shown. Thus, two vertically upwards pointing rods could be mounted on horizontal limb 162, which rods, in assembly, would fit into appropriately sized and distanced bores in the container housing 160.

The advantage of this embodiment is, of course, the possibility of easily removing, and carrying along, the container housing 160 for purposes of picnicking, etc.

An embodiment is also envisaged in which the entire headrest could be pulled off leaving on the seat edge only the headrest base in the form of an elongated slab joined to the backrest of the seat by means of the already mentioned rods 8,8', and carrying two upwards pointing rods onto which would be mountable the entire headrest, including the beverage container. The latter could be accommodated in a recess of appropriate dimensions in the headrest.

In relatively low-slung cars it would be possible to attach the headrest according to the invention in an upside-down position to the car roof.

While the embodiments described are all of the non-tiltable type i.e., their inclination relative to the backrest is fixed, it is obviously possible to modify these embodiments to the effect of providing for adjustability of tilt.

It is also clearly possible to provide any or all of these embodiments with conventional cocks instead of, or in addition to, the dispensing valves 44.

Another feature that can be incorporated into these embodiments is the adjustability, between certain limits, of the distance between the mounting rods 8,8', so as to ensure compatibility with existing seat backrests.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A headreast for a seat having a backrest of a conveyance, comprising:
   a headrest body mountable on the backrest of said seat and shaped to accommodate at least one container for a beverage;
   means for fixedly inter-engaging said headrest and said backrest;
   at least one hollow container removably insertable in said headrest body;
   means for access to said at least one container for the removal thereof from, and reinsertion thereof into, said headrest;
   at least a portion of said headrest constituting a receptacle for said at least one container;
   a tube connector means on said headrest body communicating with the hollow interior of said at least one container when said at least one container is mounted in said headrest body; and
   means for dispensing said beverage from said container comprising a length of flexible tubing having one end attachable to said tube connector means, and a mouthpiece means attachable to the other end of said flexible tubing, said mouthpiece means comprising dispensing valve means for controlling beverage flow from said container.

2. The headrest as claimed in claim 1, wherein: said means for access to said container comprises a closure means articulated to said headrest body.

3. The headrest as claimed in claim 2 wherein: said closure means comprises a door means.

4. The headrest as claimed in claim 3 wherein:
   a part of said container receptacle is in said headrest body; and
   the remainder of said container receptacle is in said door means.

5. The headrest as claimed in claim 4, wherein: said at least one container is provided with first valve means for controlling beverage outflow, and second valve means for controlling air inflow.

6. The headrest as claimed in claim 5 wherein:
   said first and second valve means comprise normally closed valves in first and second parts of said container;
   first and second valve actuating means are provided on said headrest body engageable with said first and second valves, respectively, for opening said valves when said at least one container is inserted into said container receptacle;
   said tube connector means communicates with said first valve means when said at least one container is inserted; and
   breather means is provided in said headrest body for communicating with said second valve means.

7. The headrest as claimed in claim 6, wherein:
   said flexible tubing comprises a closely wound coil portion over most of the length thereof; and
   a tubing receptacle means is provided inside said headrest for receiving and concealing at least said coil portion of said tubing in a closely wound state when not in use, said tubing being substantially expansible when pulled at one of its ends.

8. The headrest as claimed in claim 7, and further comprising:
   biasing means for restoring at least said coil portion of said tubing to said closely wound and concealed state when said tubing is released after use.

9. The headrest as claimed in claim 2 wherein: said closure means comprises a lid means.

10. The headrest as claimed in claim 1, wherein: said means for access to said container comprises a lid removably attachable to a portion of said receptacle.

11. The headrest as claimed in claim 1, wherein:
    said flexible tubing comprises a closely wound coil portion over most of the length thereof; and a tubing receptacle means is provided inside said headrest for receiving and concealing at least said coil portion of said tubing in a closely wound state when said tubing being substantially expansible when pulled at one of its ends.

12. The headrest as claimed in claim 11, and further comprising:

biasing means for restoring at least said coil portion of said tubing to said closely wound and concealed state when said tubing is released after use.

13. The headrest as claimed in claim 11 wherein:

a part of said container receptacle is in said headrest body;

the remainder of said container receptacle is in said door means.

14. The headrest as claimed in claim 1, wherein: said at least one container is provided with first valve means for controlling beverage outflow, and second valve means for controlling air inflow.

15. The headrest as claimed in claim 14 wherein:

said first and second valve means comprise normally closed valves in first and second parts of said container;

first and second valve actuating means are provided in said headrest body engageable with said first and second valves, respectively, for opening said valves when said at least one container is inserted into said container receptacle;

said tube connector means communicates with said first valve means when said at least one container is inserted; and breather means is provided in said headrest body for communicating with said second valve means.

16. The headrest as claimed in claim 1, and further comprising: a liquid-tight box-like holder insertable into said receptacle and having an inner chamber for receiving said at least one container so that said holder is interposable between said at least one container and said headrest body.

17. A headrest for a seat having a backrest of a conveyance, comprising:

a headrest base mountable on the backrest of said seat;

a hollow container for a beverage accommodated in a housing selectively attachable to, and removable from, said headrest base;

a tube connector means communicating with the hollow interior of said container; and means for dispensing said beverage from said container comprising a length of flexible tubing having one end attachable to said tube connector means, and a mouthpiece means attachable to the other end of said flexible tubing, said mouthpiece means comprising valve means for controlling beverage flow from said container.

18. The headrest as claimed in claim 17, and further comprising: guide and retaining means in the form of interlocking rails attached to both said headrest base and said container housing for facilitating removable attachment of said container housing to said headrest base.

* * * * *